US009832354B2

(12) United States Patent
McBride et al.

(10) Patent No.: US 9,832,354 B2
(45) Date of Patent: Nov. 28, 2017

(54) BUBBLE FOR SURVEILLANCE CAMERA

(71) Applicant: Sensormatic Electronics, LLC, Boca Raton, FL (US)

(72) Inventors: Frederick Michael McBride, Belfast (GB); Walter A. Martin, County Antrim (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 90 days.

(21) Appl. No.: 14/802,788

(22) Filed: Jul. 17, 2015

(65) Prior Publication Data

US 2017/0019571 A1 Jan. 19, 2017

(51) Int. Cl.
*H04N 5/225* (2006.01)
*G08B 13/196* (2006.01)

(52) U.S. Cl.
CPC ....... *H04N 5/2252* (2013.01); *G08B 13/1963* (2013.01); *G08B 13/19617* (2013.01)

(58) Field of Classification Search
CPC .... H04N 5/2251–5/2254; H04N 5/232; H04N 5/23202; H04N 5/23206; H04N 5/23238; H04N 5/23296; H04N 7/18; H04N 7/181; H04N 7/183; H04N 7/186; H04N 7/188; H04N 1/00204; H04N 1/00244; H04N 5/23203; H04N 5/2259; G08B 13/19617; G08B 13/19619; G08B 13/19626; G08B 13/19628; G08B 13/1963; G08B 13/19632; G03B 11/02–11/048; G03B 17/12; G03B 17/14; G03B 17/56; G03B 17/568
See application file for complete search history.

(56) References Cited

U.S. PATENT DOCUMENTS

| | | | | |
|---|---|---|---|---|
| 3,819,856 A | * | 6/1974 | Pearl | G08B 13/19619 348/151 |
| 2010/0283842 A1 | * | 11/2010 | Guissin | G02B 13/06 348/68 |
| 2012/0045197 A1 | * | 2/2012 | Jones | G03B 17/02 396/427 |
| 2012/0242788 A1 | * | 9/2012 | Chuang | G08B 13/19602 348/36 |
| 2014/0055624 A1 | * | 2/2014 | Gaines | H04N 5/2254 348/207.1 |
| 2014/0307088 A1 | | 10/2014 | DeJesus et al. | |
| 2016/0112608 A1 | * | 4/2016 | Elensi | H04N 5/2252 348/143 |

OTHER PUBLICATIONS

"D4SO Series: Outdoor IP66 4 Low Cost Dome." Arecont Vision. 2013. Two pages.
"IP Surveillance Solutions: Arecont Vision." Anixter. 2013. 164 pages.

* cited by examiner

*Primary Examiner* — Paul Berardesca
(74) *Attorney, Agent, or Firm* — HoustonHogle LLP

(57) ABSTRACT

A bubble for a surveillance camera has at least one planar transparent region. The at least one planar transparent region is aligned with an optical axis of a camera head of the surveillance camera. In a preferred embodiment, the bubble can include at least one bubble section having one or more window cutouts. The at least one planar transparent region can be one or more planar window elements that are installed within the one or more window cutouts of the bubble section.

22 Claims, 10 Drawing Sheets

BUBBLE FOR SURVEILLANCE CAMERA

BACKGROUND OF THE INVENTION

Surveillance cameras are an integral part of security solutions for protecting people, premises, and reducing risk. The surveillance cameras are often installed at egress points, at points of sale, and in other locations that require monitoring and tracking of people, goods, and services. Another common application is at casinos. The surveillance cameras are used to monitor employees and players.

Surveillance cameras typically include camera bases having mounting regions or portions for attaching the surveillance cameras to walls or ceilings within the premises. In one example, camera bases are mounted to walls via wall brackets. In another example, camera bases are mounted within ceilings in a recessed fashion similar to recessed lighting. The camera bases generally house electronics, network and video interfaces, and cooling fans for thermal management.

Surveillance cameras also have camera heads that are typically pointable in different directions using gimbal assemblies. Often the gimbal assemblies enable movement about at least two rotational axes (e.g., two-axis gimbal assembly or three-axis gimbal assembly). The two-axis gimbal assembly provides rotational movement about a pan axis and rotational movement about a tilt axis for the camera head. The three-axis gimbal assembly provides rotational movement about the pan axis, rotational movement about the tilt axis, and rotational movement about a roll axis for the camera head.

Two types of surveillance cameras include an adjustable surveillance camera and a motorized surveillance camera. The gimbal assembly of an adjustable surveillance camera is manually moved to different positions so that the camera head can be pointed down a hall or at a door, for example, usually during installation. The motorized surveillance camera, such as a pan-tilt-zoom (PTZ) surveillance camera, utilizes a motorized gimbal assembly to automatically move the camera head to different positions usually under operator or automatic control (guard touring).

Adjustable and motorized surveillance cameras often include bubbles that cover the camera heads. The bubbles often have a hemispherical shape and function to protect camera heads from mechanical impact and conceal the positioning and movement of the gimbal assemblies. Typically, bubbles are permanently mounted to camera bases of adjustable and motorized surveillance cameras.

Some adjustable and motorized surveillance cameras are configured to receive bubble adapters. The bubble adapters are mounted and secured to the camera bases of compatible surveillance cameras. Bubble adapters can then be added to existing surveillance cameras on an "as-needed" basis.

SUMMARY OF THE INVENTION

The hemispherical shape of bubbles can negatively impact quality of the images captured by the surveillance cameras. Due to the curvature of conventional bubbles, light can be internally reflected within bubbles before exiting the bubble and being refracted and received by camera image sensors. When this reflected light is received by the camera image sensors, it causes image distortion to occur due to the beam walk-off.

The present invention is directed toward a bubble having one or more planar transparent regions that can be aligned with an optical axis of a lens system of the camera head. The bubble can reduce image distortion by reducing the amount of internally reflected light reaching the image sensor.

In general, according to one aspect, the invention features a surveillance camera including a camera head having a lens system. Typically, the camera head is adjustable with respect to a camera base of the surveillance camera. The surveillance camera has a bubble including at least one planar transparent region that is adapted to be aligned with an optical axis of the lens system.

In an embodiment, the bubble can include at least one bubble section having one or more window cutouts. The at least one planar transparent region can be one or more planar window elements that are installed within the one or more window cutouts of the bubble section. The bubble section is preferably non transparent.

In a preferred example, the bubble is constructed of a first quarter-sphere bubble section and a second quarter-sphere bubble section. In this example, the at least one planar transparent region is at least one planar window element. Further, the at least one planar window element is installed within at least one window cutout formed by the first quarter-sphere bubble section and the second quarter-sphere bubble section.

The at least one planar transparent region is preferably five planar transparent regions.

In a preferred embodiment, the bubble is configured to pan around a central axis of the surveillance camera. In another preferred embodiment, the bubble is configured to pivot to match a selected tilting angle of the camera head to align the planar transparent region with the optical axis of the lens system of the camera head.

In a preferred embodiment, the bubble is part of a bubble adapter mounted to a base of the camera head via a field-deployable attachment mechanism having an interference fit system. The interference fit system can include spring plungers disposed in spring plunger pockets within the bubble adapter and an annular groove in a mounting region of the base which accepts the spring plungers.

In an example embodiment, the bubble can further include one or more dummy window elements.

In general, according to another aspect, the invention features a bubble for a surveillance camera. The bubble includes at least one planar transparent region. The at least one planar transparent region is aligned with an optical axis of a lens system of a camera head of the surveillance camera.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, operations, elements, components, and/or groups, but do not preclude the presence or addition of one or more other features, operations, elements, components, and/or groups thereof.

Figure 1:
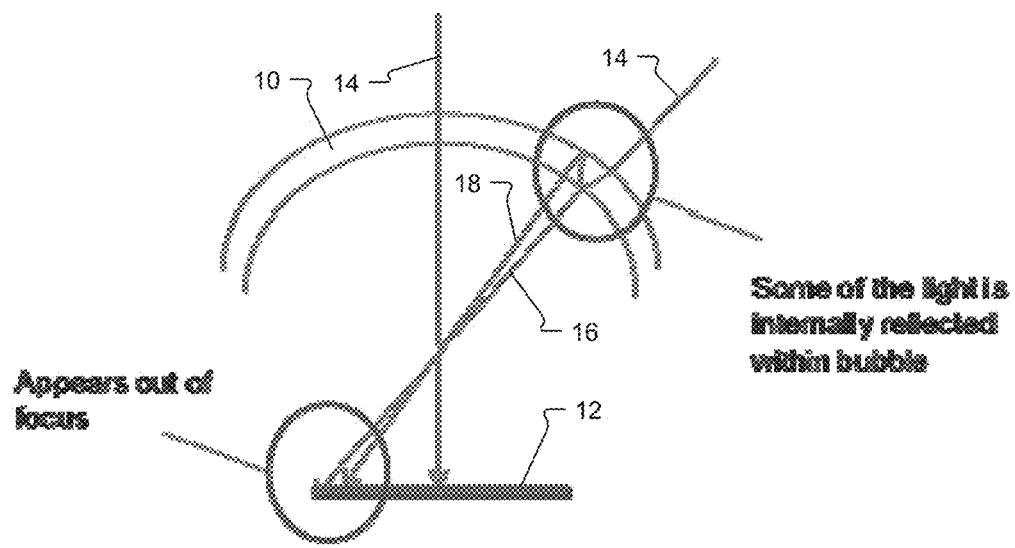
FIG. 1 is a schematic diagram illustrating the effect of internal reflections in a conventional bubble.

FIG. 1 is a schematic view illustrating an effect of internal reflections in a conventional bubble 10. External light 14 passes through the bubble to a reference plane 12 corresponding to a camera sensor, for example. Some of the external light 14 is received as a direct beam 16. Other external light 14 is reflected within the bubble 10 and received as a bubble reflected beam 18. The bubble reflected beam is refracted and directed by the curvature of the conventional bubble 10.

As shown in FIG. 1, this bubble reflected beam 18 is slightly offset due to refraction and beam walk-off. The resulting image distortion is particularly noticeable above 1080p (high definition video mode) where small high density pixels exaggerate the image distortion.

Figure 2:
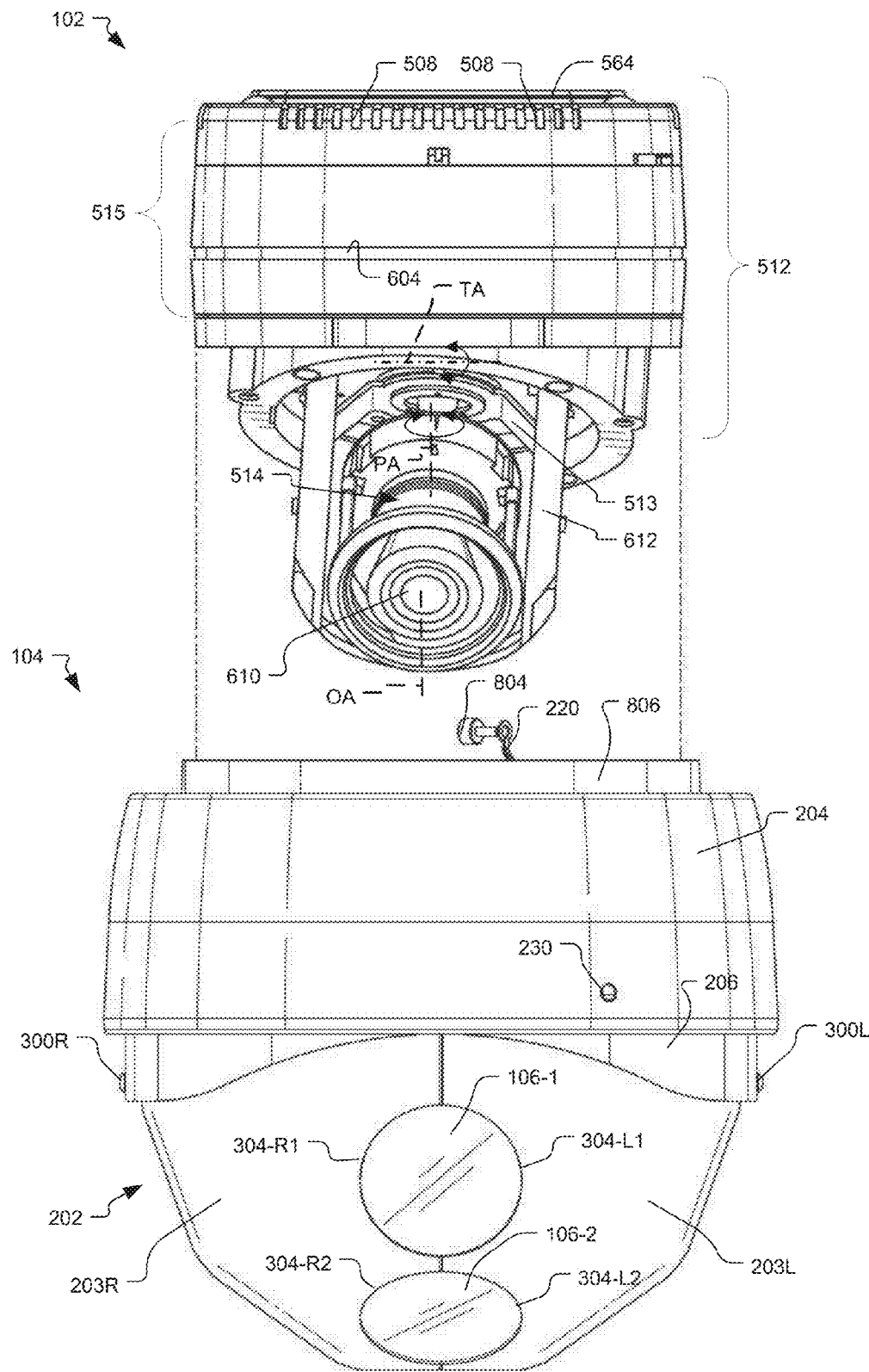
FIG. 2 is a side view of an adjustable surveillance camera accepting a bubble adapter according to an embodiment of the invention.

FIG. 2 illustrates a bubble adapter 104 having a bubble 202 that provides a solution to the above described image distortion problem according to an embodiment of the present invention.

Figure 3A:
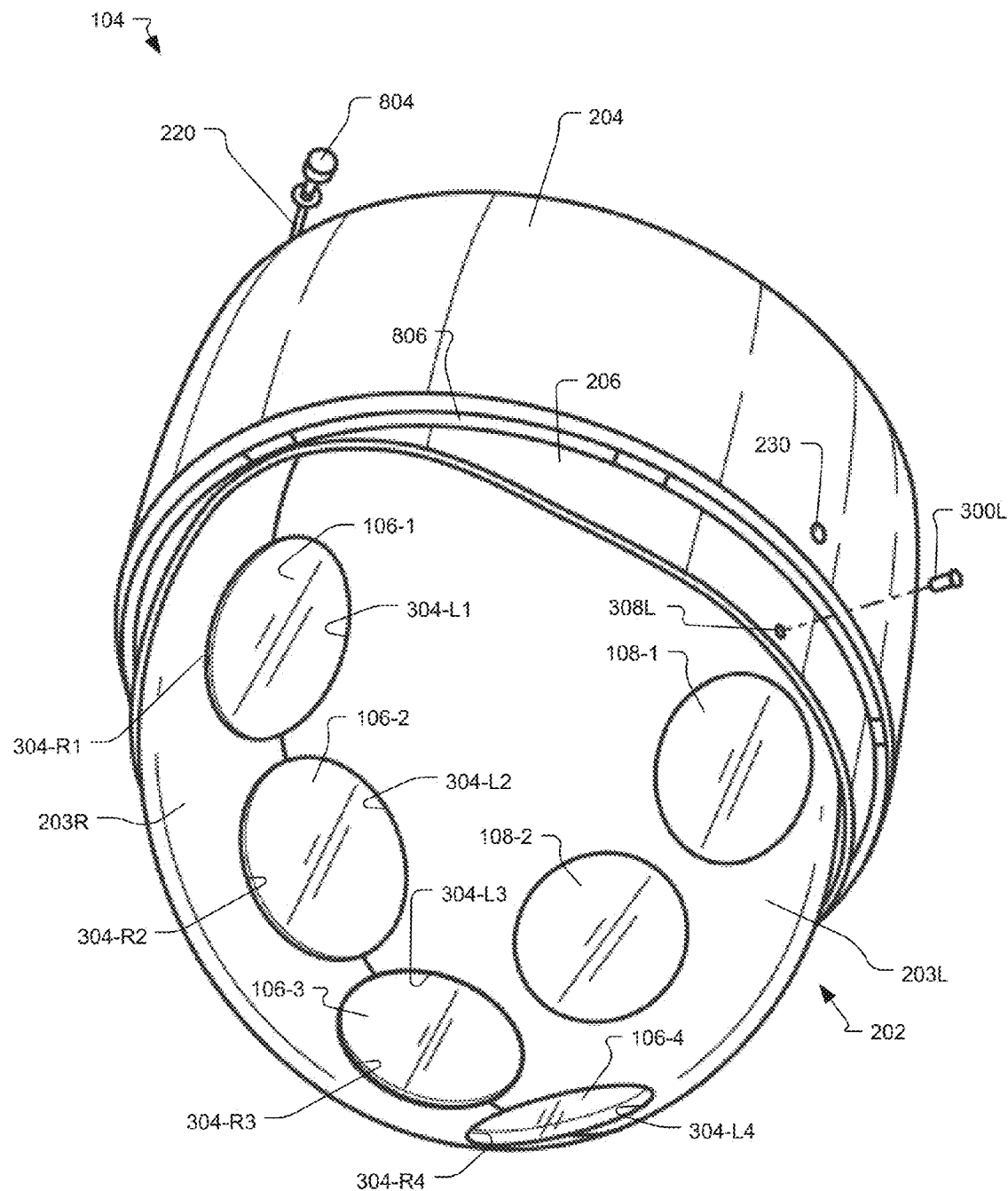
FIGS. 3A-3B are perspective views of the inventive bubble adapter of FIG. 2.
Figure 3B:
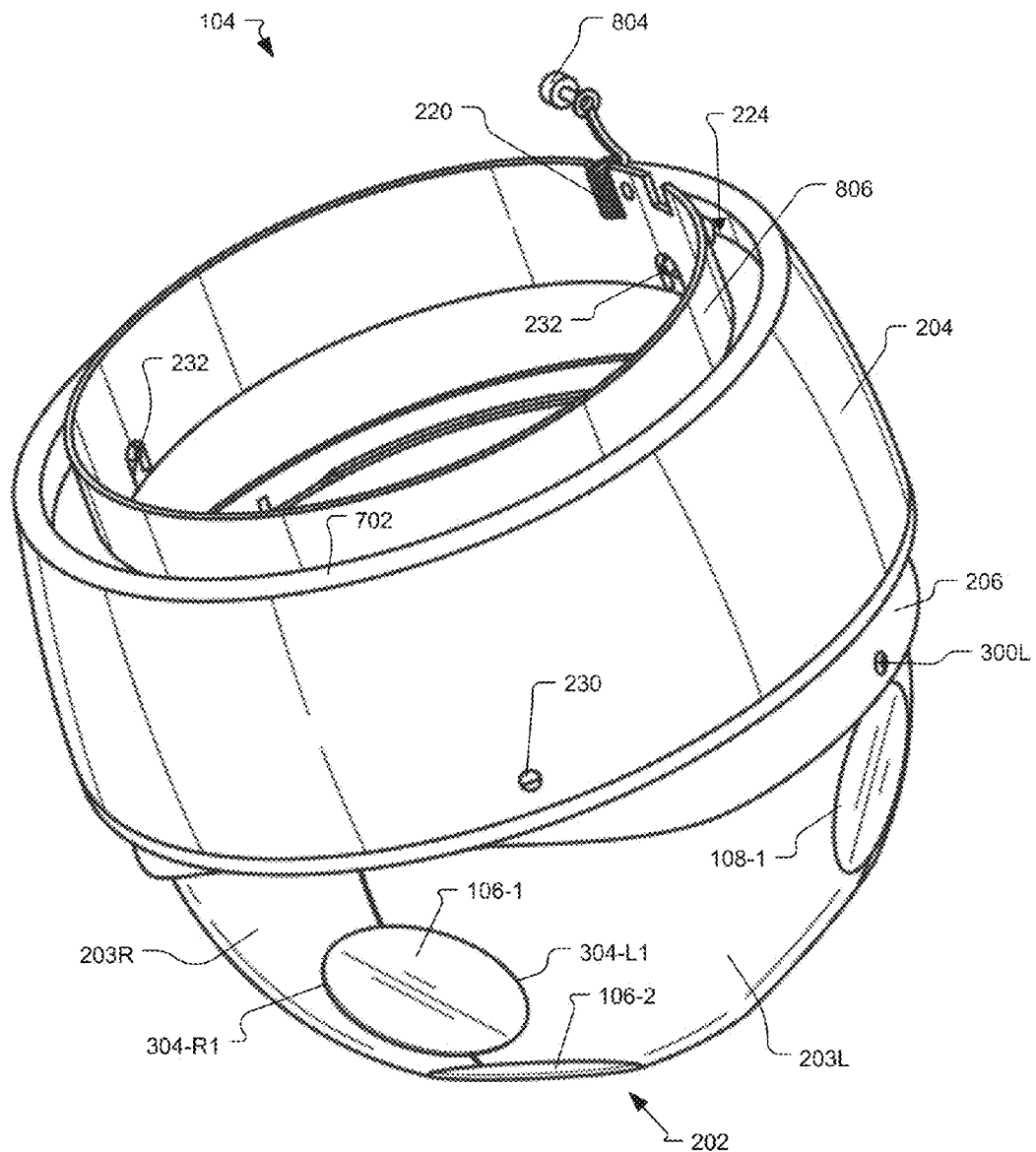

The bubble 202 includes at least one planar transparent region (see e.g., 106-1) that reduces internal reflections within the bubble 202. As illustrated in FIGS. 2, 3A, and 3B, the at least one planar transparent region can be multiple planar window elements 106-1 through 106-5. Each planar window element 106-1 through 106-5 provides a flat surface so that one of which can be aligned with an optical axis OA of the adjustable surveillance camera 102. As external light passes through the flat surface of one of the planar window elements 106-1 through 106-5, internal reflection is reduced or eliminated in the bubble 202 compared to the conventional bubble 10, which reduces overall image distortion from occurring at the camera sensor of the adjustable surveillance camera 102.

In the illustrated embodiment, the bubble adapter 104 is secured to an installed adjustable surveillance camera 102 as a field-upgradeable solution. When field service personnel secure the bubble adapter 104 to the installed adjustable surveillance camera 102, there is no need to remove or modify the adjustable surveillance camera 102. The bubble adapter 104 utilizes a field-deployable attachment mechanism to secure the bubble adapter 104 to the adjustable surveillance camera 102 as disclosed in U.S. Patent Pub. No. US 2014/0307088 A1, which is incorporated by reference. The field-deployable attachment mechanism particularly uses a press fit feature (e.g., "snap" in or clip on) for securing the bubble adapter 104 to the adjustable surveillance camera 102.

The adjustable surveillance camera 102 has a number of components. For example, the adjustable surveillance camera 102 includes a camera base 512, a camera head 514, a camera head cover 612, and a gimbal assembly 513 that enables movement of the camera head 514 about a pan axis PA (orthogonal to the plane defined by the base 512) and about a tilt axis TA.

The camera base 512 includes a mounting region 515 for attaching the adjustable surveillance camera 102 to a wall or ceiling. Field service personnel secure the adjustable surveillance camera 102 to the wall or ceiling via screw holes provided in the distal side 564 of the camera base 512. The camera base 512 typically houses a number of components such as electronics, network and video interfaces, cooling fans, and control systems.

The mounting region 515 of the camera base 512 is also used for providing an interference fit with the bubble adapter 104. The mounting region 515 includes an annular groove 604 that encircles the camera base 512. The annular groove 604 is part of the above described field-deployable attachment mechanism for providing the interference fit between the bubble adapter 104 and the adjustable surveillance camera 102.

The camera base 512 includes air exhaust openings 508 for enabling airflow to its internal components. Cooling fans in the camera base 512 draw outside air through air inlets. The air drawn in from the air inlets flows across the internal components, cooling the components in the process. The air then exits the adjustable surveillance camera 102 via the air exhaust openings 508 of the camera base 512.

The gimbal assembly 513 allows for the camera head 514 to be adjustable with respect to the camera base 512. In the illustrated example, the gimbal assembly 513 is a two-axis gimbal that provides rotational movement about the pan axis PA and rotational movement about the tilt axis TA. In another example, the gimbal assembly 513 is a three-axis gimbal that provides rotational movement about the pan axis PA, rotational movement about the tilt axis TA, and rotational movement about a roll axis. As shown, the camera head 514 is mounted to the gimbal assembly 513. During installation of the adjustable surveillance camera 102, the gimbal assembly 513 can be manually moved to different positions so that the camera head 514 can be pointed down a hall or at a door, for example. The gimbal assembly 514 can provide about 360 degrees of rotational movement about the pan axis PA and about 90 degrees of rotational movement about the tilt axis T, in one example.

The camera head 514 includes a lens system 610 for collecting light received in the direction of the optical axis and then images that light onto a camera sensor (e.g., imager chip) housed within the head.

Figure 4:
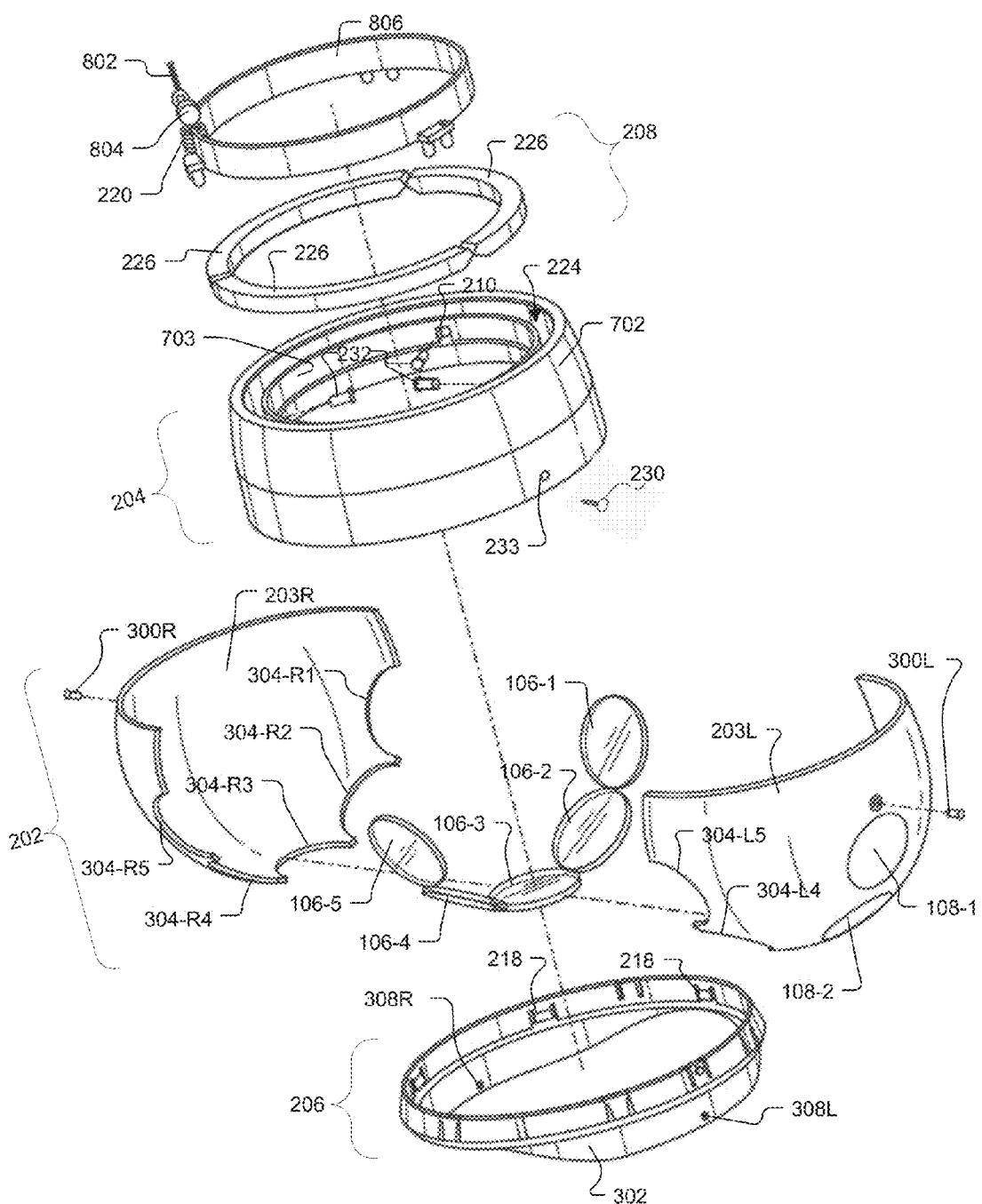
FIG. 4 is an exploded view of the inventive bubble adapter of FIG. 2.

FIGS. 3A and 3B show different angular views of the bubble adapter 104 illustrating the various components. Also. FIG. 4 illustrates an exploded view of the bubble adapter 104 showing how the bubble adapter 104 is generally constructed. The main components of the bubble adapter 104 include a housing 204, the bubble 202, and a cover ring 806.

The bubble 202 is divided into two bubble sections. One bubble section is a left side quarter-sphere bubble section 203L and the other bubble section is a right side quarter-sphere bubble section 203R. These quarter-sphere bubble sections 203L, 203R have window cutouts 304-L1 through 304-L5 and 304-R1 through 304-R5. In particular, the right side quarter-sphere bubble section 203R has right side window cutouts 304-R1, 304-R2, 304-R3, 304-R4, 304-R5 and the left side quarter-sphere bubble section 203L has left side window cutouts 304-L1, 304-L2, 304-L3, 304-L4, 304-L5.

The left side window cutouts 304-L1 through 304-L5 match corresponding right side window cutouts 304-R1 through 304-R5 forming openings configured to receive the planar window elements 106-1 through 106-5. Each planar window element 106-1 through 106-5 is installed within each corresponding opening formed by the window cutouts 304-L1 through 304-L5/304-R1 through 304-R5. For example, the left quarter-sphere bubble section 203L has a first left side window cutout 304-L1 that forms a semicircle and the right quarter-sphere bubble section 203R has a first right side window cutout 304-R1 that forms a semicircle. When the left quarter-sphere bubble section 203L is fastened to the right quarter-sphere bubble section 203R, the first left side window cutout 304-L1 corresponds with the first right side window cutout 304-R1 to form a generally circular opening that can receive the first planar window element 106-1. This described installation of the first planar window element 106-1 is the same for the second, third, fourth, and fifth planar window elements 106-2 through 106-5. The planar window elements 106-1 through 106-5 are transparent and can be made of glass or plastic. As illustrated, the bubble 202 includes five planar window elements 106-1 through 106-5 installed within the two quarter-sphere bubble sections 203L, 203R. The bubble 202 can include more or less than five planar window elements as appreciated by one of skill in the art.

The quarter-sphere bubble sections 203L, 203R are non-transparent and can be molded from different materials. In one example, the quarter-sphere bubble sections 203L, 203R are molded from glass. In another example, the quarter-sphere bubble sections 203L, 203R are molded from plastic such as high-impact plastic. In the preferred embodiment, the quarter-sphere bubble sections 203L, 203R are made from a non-transparent material having a darkened or "smoked" finish or appearance that can hide where the camera head 510 is pointing. For example, the quarter-sphere bubble sections 203L, 203R are made from a glass or plastic material that is smoked or opaque. In another example, the quarter-sphere bubble sections 203L, 203R are made from a non-transparent plastic or glass material having a frosted or milky appearance.

The quarter-sphere bubble sections 203L, 203R can optionally include dummy window elements 108. The dummy window elements 108 are created within the molding of the quarter-sphere bubble sections 203L, 203R. The dummy window elements 108 are meant to distract and disguise a viewer from the true target planar window elements 106. Thus, a viewer is not able to easily determine which of the window elements 106, 108 are planar window elements 106 versus dummy window elements 108.

The right and left quarter-sphere bubble sections 203R, 203L include respective right and left pivot bosses 300R, 300L. Each respective pivot boss 300R, 300L is inserted through a pivot trim ring 206 and is integral with a respective one of the right or left quarter-sphere bubble section 203R, 203L. This arrangement allows for the bubble 202 to pivot with respect to the pivot trim ring 206 using the pivot bosses 300R, 300L. In another example, each pivot boss 300R, 300L is a separate element that is inserted through the pivot trim ring and secured to a respective quarter-sphere bubble section 203R, 203L.

As illustrated, the pivot trim ring 206 is slipped over the bubble 202 to secure the bubble 202 to the housing 204. In particular, the pivot trim ring 206 is fastened to the housing 204, which secures the bubble 202 to the housing 204. To achieve this, the trim ring 206 has integrated tabs 218 that lock into place within tab openings of the housing 204. When the tabs 218 are fully seated within the tab openings, the bubble 202 is secured to the housing 204 of the bubble adapter 104. The pivot trim ring 206 includes a trim lip portion 302 having a right trim pivot hole 308R for receiving the right pivot boss 300R and a left trim pivot hole 308L for receiving the left pivot boss 300L of the respective quarter-sphere bubble sections 203R, 203L. The pivot trim ring 206 utilizes the pivot bosses 300R, 300L to enable the bubble 202 to pivot within the pivot trim ring 206.

The housing 204 has an air intake channel 224 that encircles the housing 204. This air intake channel 224 is preferably recessed with respect to the inner rim 703 and the outer rim 702 of the housing 204.

The housing 204 includes spring plungers 232 which are part of the field-deployable attachment mechanism, for securing the bubble adapter 104 to the adjustable surveillance camera 102. The spring plungers 232 are installed within an inner rim 703 of the housing 204. The spring plungers 232 engage with the annular groove 604 of the camera base 512 form an interference system. In particular, the spring plungers 232 are accepted by the annular groove 604 which provides an interference fit between the housing 204 of the bubble adapter 104 and the camera base 512 of the adjustable surveillance camera 102.

Spring plungers 232 are installed and accepted within spring plunger pockets 210. These spring plunger pockets 210 extend radially out from the inside of the outer rim 702 of the housing 204, through the air intake channel 224 of the housing 204, and to the inner rim 703 of the housing 204. The spring plungers 232 sit within the spring plunger pockets 210 such that the surfaces of the spring plungers 232 extend slightly beyond the edge of the inner rim 703 of the housing 204 when the spring plungers 232 are at rest. In the illustrated embodiment, the housing 204 has three spring plungers 232 installed in spring plunger pockets 210 of which are equally spaced apart within the housing 204.

The spring plungers 232 use spring-loaded properties to secure the bubble adapter 104 to the adjustable surveillance camera 102. The spring plungers 232 are normally in a fully-released or "at rest" position. In use, the installer inserts the bubble adapter 104 over the adjustable surveillance camera 102. When the installer pushes the bubble adapter 104 down over the camera head 514 towards the camera base 512, the spring plungers 232 initially compress when they come in contact with the camera base 512. The spring plungers 232 compress inward towards the outer rim 702 of the housing 204. When the installer continues to push the bubble adapter 104 further onto the mounting region 515 of the camera base 512, the spring plungers 232 release their tension when the spring plungers 232 encounter the annular groove 604 within the mounting region 515. The surfaces of the spring plungers 232 are preferably spherical, allowing the spring plungers 232 to "snap" in and out of place within the annular groove 604 in response to adjustment of the bubble adapter 104 about the camera base 512 of the adjustable surveillance camera 102 by the installer.

Since the annular groove 604 encircles the entirety of the camera base 512, the installation of the bubble adapter 104 to the adjustable surveillance camera 102 does not require special alignment considerations. Moreover, once the bubble adapter 104 is installed, the action of the spring plungers 232 allows installers to easily detach and reattach the bubble adapter 104 from the camera base 512 without the aid of tools, for example.

The housing 204 also includes a set screw 230 for fastening the housing 204 to the camera base 512. As shown in FIG. 4, the housing 204 includes a set screw hole 233 that accepts the set screw 230. The installer tightens the set screw 230 within the set screw hole 233 until the set screw 230 fastens the housing 204 of the bubble adapter 104 to the camera base 512 of the adjustable surveillance camera 102. This attaches the bubble adapter 104 to the adjustable surveillance camera 102 after the bubble adapter 104 is attached to the adjustable surveillance camera 102 via the interference system provided by the combination of the spring plungers 232 and the annular groove 604 and prevents any rotation of the bubble adapter 512 relative to the camera 102. In yet another example, the bubble adapter 104 is attached to the adjustable surveillance camera using only the aforementioned permanent set screw mechanism, by tightening the set screw 230 within the set screw hole 233 until the housing 204 is attached to the camera base 512 of the adjustable surveillance camera 102.

The air intake channel 224 of the housing 204 accepts a replaceable air filter 208 that is preferably press-fit within the air intake channel 224. The air filter 208 has filter sections 226 that preferably press-fit into place within the air intake channel 224. In one example, the filter sections 226 snugly fit between the spring plungers 232 that protrude through the air intake channel 224.

The cover ring 806 is attached to the housing 204 via a screw 802. In particular, the cover ring 806 sits within the air intake channel 224 and is secured to the housing 204 via screw 802. In one implementation, the screw 802 is made of plastite material. In general, the cover ring 806 functions as a cosmetic cover that hides the standard black body of the adjustable surveillance camera 102 when used with a non-black bubble adapter 104.

The cover ring 806 includes a safety lanyard 220 that can be attached to the adjustable surveillance camera 102. For example, the installer fastens the safety lanyard 220 to the camera base 512 via a thumb screw 804 during installation of the bubble adapter 104. The safety lanyard 220 prevents the bubble adapter 104 from dropping during installation, which protects the bubble adapter 104 from damage and the installer from potential injury during installation.

Figure 5:
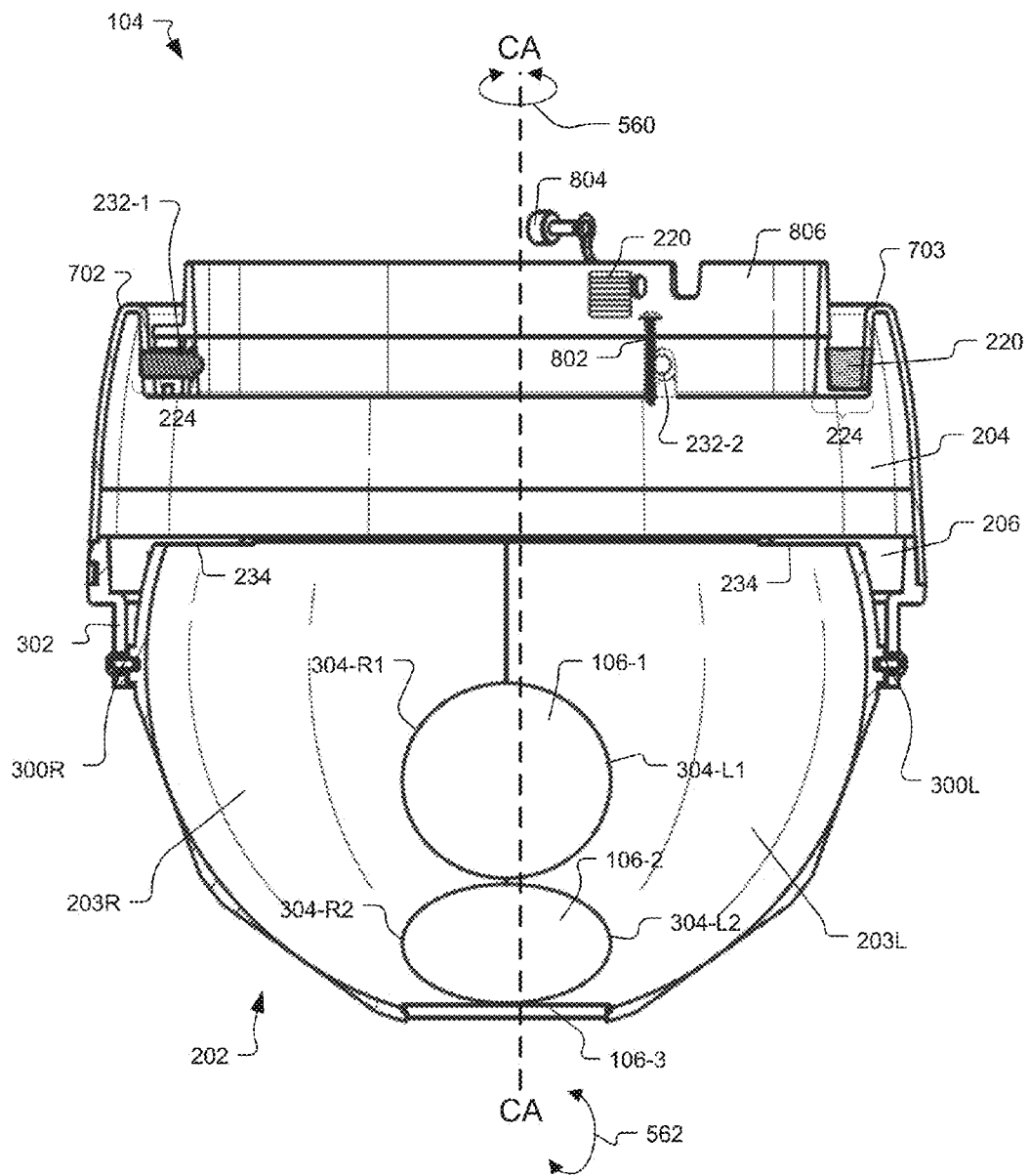
FIG. 5 is a cross-sectional view of the inventive bubble adapter of FIG. 2.

FIG. 5 is a cross-sectional view of the bubble adapter 104 showing how the components of the bubble adapter 104 are arranged with respect to one another. In particular, this figure illustrates how the pivot trim ring 206 slides over the lip 234 of the bubble 202 and then fastens to the housing 204. The cross-sectional view of FIG. 5 also provides a "head-on" view of a first spring plunger 232-1 and a side view of a second spring plunger 232-2 through the air intake channel 224. Also, shown in FIG. 5, the cover ring 806 sits within the air intake channel 224 and is secured to the housing 204 by the screw 802. The included thumbscrew 804 provides for convenient attachment of the safety lanyard 220 to the camera base 512 of the adjustable surveillance camera 102 for added safety during installation.

FIG. 5 particularly illustrates how the components of the bubble adapter 104 are arranged to enable the bubble 202 to pan 560 and pivot 562. Panning 560 results from rotation between the housing 204 of the bubble adapter 104 and the camera base 512 of the adjustable surveillance camera 102. Pivoting 562 results from interaction between the pivot bosses 300R, 300L of the bubble 202 and the pivot trim ring 206. In particular, the pivot bosses 300R, 300L function as pivot points allowing the bubble 202 to pivot on the pivot trim ring 206. In one example, the bosses 300R, 300L are locking screws that can tightened to a set pivoted position. The bubble 202 can be pivoted while the adjustable surveillance camera 102 is in use. Thus, the bubble 202 with the planar window elements 106-1 through 106-5 can pan 560 and pivot 562 to ensure that one of the window elements 106-1 through 106-5 is aligned with the optical axis (i.e., positioned in line with the lens system 610) of the camera head 514.

Figure 6A:
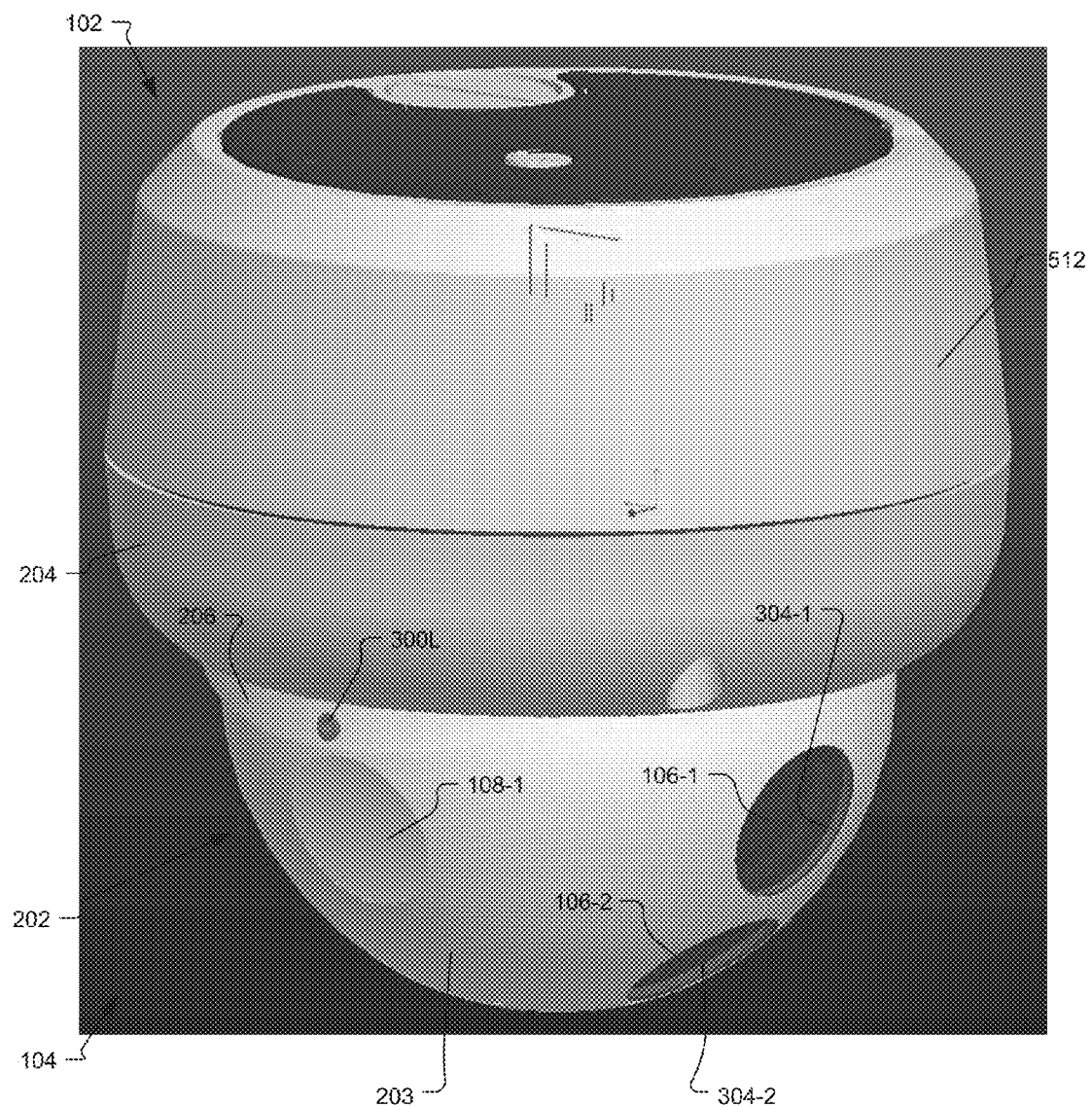
FIGS. 6A-6C are perspective views of the bubble adapter according to another embodiment of the invention.
Figure 6B:
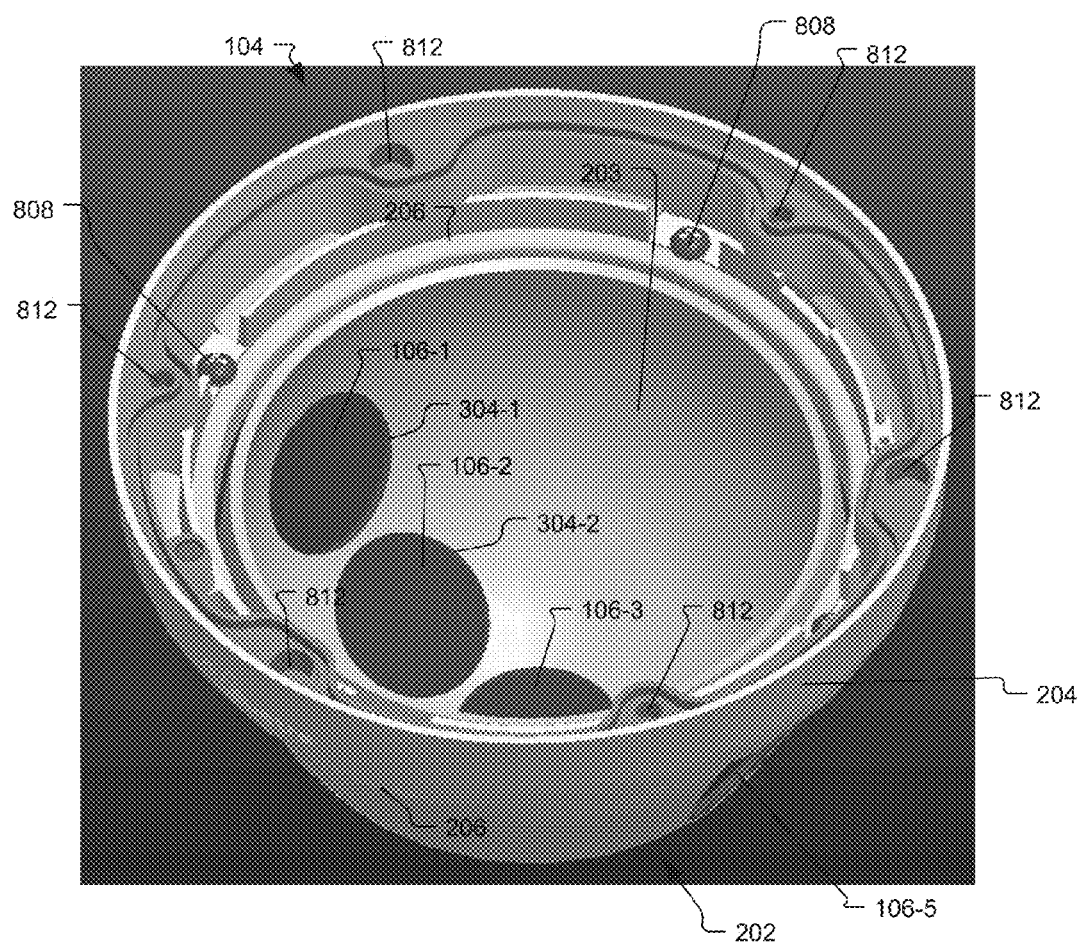
Figure 6C:
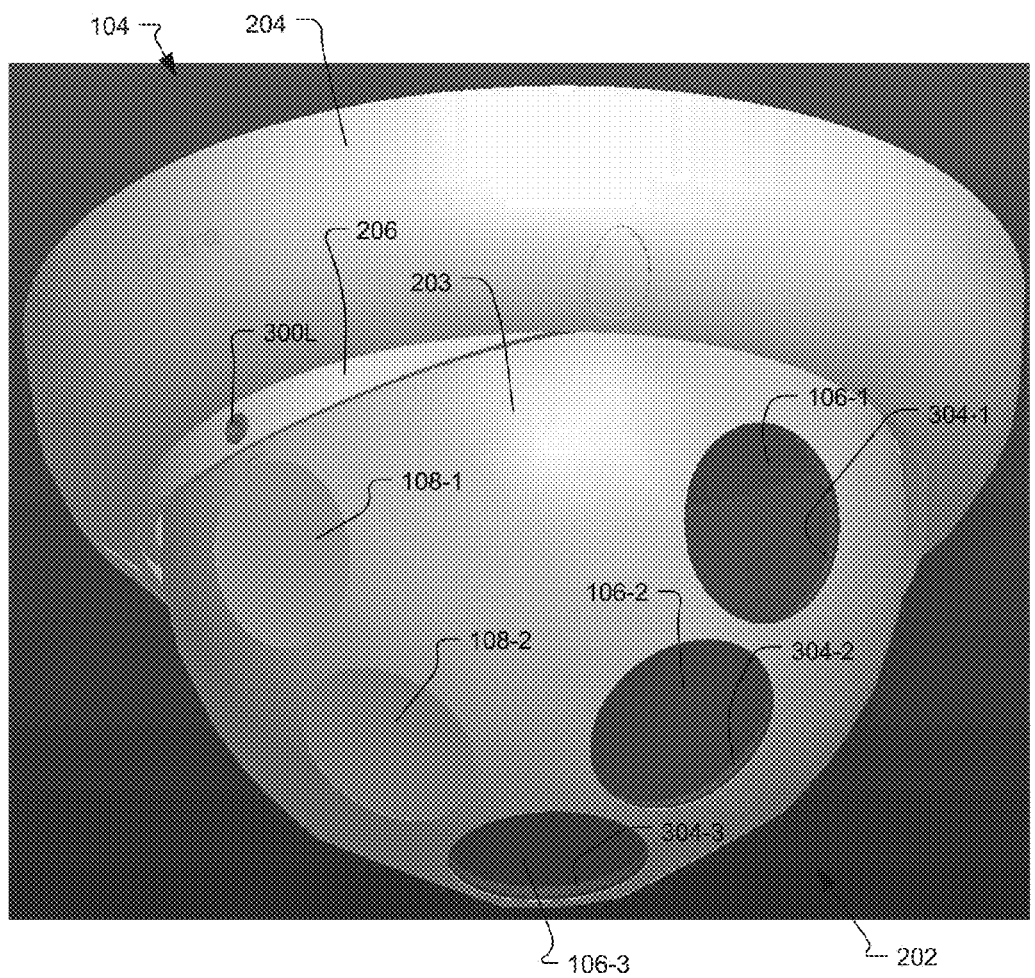

FIGS. 6A-6C show another embodiment of the bubble adapter 104. This bubble adapter 104 generally includes the same components as the bubble adapter 104 illustrated in FIG. 3A-FIG. 5.

FIG. 6A illustrates the bubble adapter 104 secured to the adjustable surveillance camera 102. FIGS. 6B-6C show different angular views of the bubble adapter 104.

In this embodiment, the pivot trim ring 206 is positioned within a pocket of the housing 204. The pivot trim ring 206 is retained within the housing by four fixing screws 808. This configuration allows for the pivot trim ring 206 to pan within the housing 204. For example, the pivot trim ring 206 can pan up to 360 degrees within the housing 204.

The bubble 202 includes a hemispherical bubble section 203. The hemispherical bubble section 203 includes window cutouts 304-1 through 304-5. The window cutouts 304-1 through 304-5 receive the planar window elements 106-1 through 106-5. Alternatively, the hemispherical bubble section 203 is a two-piece design with two quarter-sphere bubble sections.

The housing 204 includes holes 812. In this embodiment, these holes 812 are part the field-deployable attachment mechanism. In particular, these holes 812 receive fixtures, such as screws, for attaching the housing 204 and thus the bubble adapter 104 to the camera base 512.

Figure 7A:
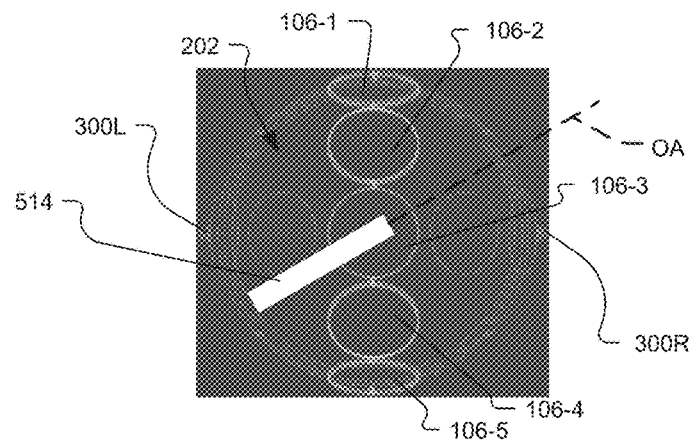
FIGS. 7A-7C are top views of a bubble of the bubble adapter in different positions with respect to a camera head of the adjustable surveillance camera.
Figure 7B:
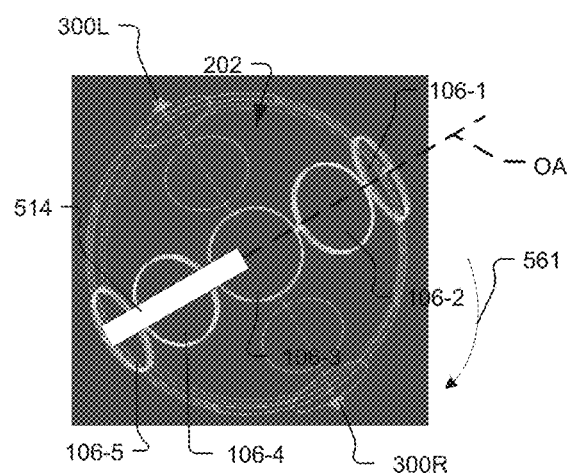
Figure 7C:
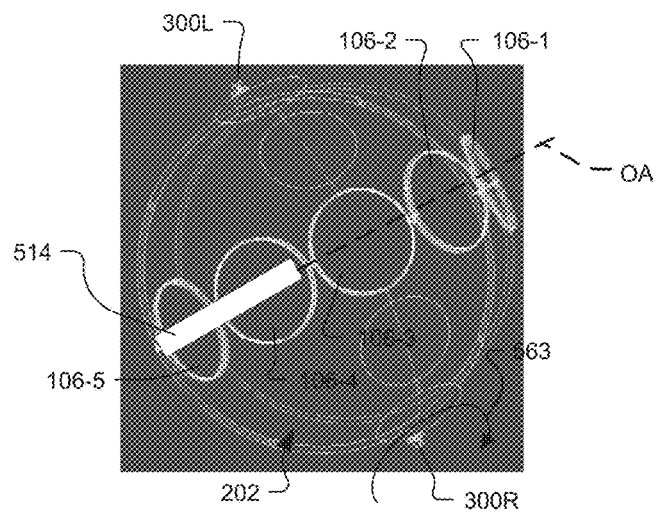

FIGS. 7A through 7C illustrate the ability to pan and pivot the bubble 102. In FIG. 7A, the camera head 514 is shown positioned such that it is unaligned with a planar window element 106. In FIG. 7B, the bubble 202 has been panned in a clockwise direction 561 compared to the bubble 202 in FIG. 7A. FIG. 7B illustrates how the bubble adapter 104 is configured to enable panning of the bubble 202 around the central axis CA in order to align the planar window elements 106-1 through 106-5 with the camera head 514. In FIG. 7C, the bubble 202 has been pivoted in a forward direction 563 compared to the bubble 202 in FIG. 7B. FIG. 7C illustrates how the bubble adapter 104 is configured to enable the bubble 202 to pivot in a direction to match a selected tilting angle (i.e., selected tilt axis) of the camera head 514 to align one of the planar window elements 106-1 through 106-5 with the optical axis OA of the lens system 610 of the camera head 514. In one example, the bubble 202 pivots within the pivot trim ring 206 a limited angle such as a maximum pivot angle of about +/−20 degrees. In another example, the bubble 202 pivots within the pivot trim ring 206 through an angle equivalent to approximately a diameter of one planar window element 106-1 through 106-5. Thus, no matter where the camera head 514 is pointed, the bubble 202 can be panned and the bubble 202 can be pivoted in order to align at least one of the planar window elements 106-1 through 106-5 with the optical axis OA of the lens system 610.

While this invention has been particularly shown and described with references to preferred embodiments thereof, it will be understood by those skilled in the art that various changes in form and details may be made therein without departing from the scope of the invention encompassed by the appended claims.

What is claimed is:

1. A surveillance camera, comprising:
   a camera head having a lens system; and
   a bubble having planar transparent regions that are adapted to be aligned with an optical axis of the lens system; and
   wherein the bubble is configured to pan and pivot independent from the camera head.

2. The surveillance camera of claim 1, wherein the bubble comprises at least one bubble section having window cutouts, the planar transparent regions being planar window elements that are installed within the window cutouts of the bubble section.

3. The surveillance camera of claim 2, wherein the bubble section is non transparent.

4. The surveillance camera of claim 1, wherein the bubble is constructed of a first quarter-sphere bubble section and a second quarter-sphere bubble section.

5. The surveillance camera of claim 4, wherein the planar transparent regions are planar window elements, the planar window elements are installed within window cutouts formed by the first quarter-sphere bubble section and the second quarter-sphere bubble section.

6. The surveillance camera of claim 1, wherein the planar transparent regions are five planar transparent regions.

7. The surveillance camera of claim 1, wherein the camera head is adjustable with respect to a camera base of the surveillance camera.

8. The surveillance camera of claim 1, wherein the bubble is configured to pan around a central axis of the surveillance camera.

9. The surveillance camera of claim 1, wherein the bubble is configured to pivot to match a selected tilting angle of the camera head to align the planar transparent regions with the optical axis of the camera head.

10. The surveillance camera of claim 1, wherein the bubble is part of a bubble adapter mounted to a base of the camera head via a field-deployable attachment mechanism having an interference fit system.

11. The surveillance camera of claim 10, wherein the interference fit system comprises:
    spring plungers disposed in spring plunger pockets within the bubble adapter; and
    an annular groove in a mounting region of the camera base which accepts the spring plungers.

12. The surveillance camera of claim 1, wherein the bubble comprises one or more dummy window elements.

13. A bubble for a surveillance camera, wherein the surveillance camera comprises a camera head having a lens system, wherein the bubble has planar transparent regions, wherein the planar transparent regions are each adapted to be aligned with an optical axis of the lens system of the camera head of the surveillance camera, wherein the bubble is configured to pan and pivot independent from the camera head.

14. The bubble of claim 13, wherein the bubble comprises at least one bubble section having one or more window cutouts, at least one of the planar transparent regions being one or more planar window elements that are installed within the one or more window cutouts of the bubble section.

15. The bubble of claim 14, wherein the bubble section is non transparent.

16. The bubble of claim 13, wherein the bubble is constructed of a first quarter-sphere bubble section and a second quarter-sphere bubble section.

17. The bubble of claim 16, wherein the planar transparent regions are planar window elements, the planar window elements are installed within window cutouts formed by the first quarter-sphere bubble section and the second quarter-sphere bubble section.

18. The bubble of claim 13, wherein the bubble is configured to pan around a central axis of the surveillance camera.

19. The bubble of claim 13, wherein the bubble is configured to pivot to match a selected tilting angle of the camera head to align one of the planar transparent regions with the optical axis of the camera head.

20. The bubble of claim 13, wherein the bubble comprises one or more dummy window elements.

21. The surveillance camera of claim 1, wherein the bubble pivots through an angle equivalent to approximately a diameter of one of the planar transparent regions.

22. The surveillance camera of claim 1, wherein the bubble is adapted to have different planar transparent regions aligned with the optical axis of the lens system.

* * * * *